United States Patent [19]

Nino

[11] Patent Number: 4,918,580

[45] Date of Patent: Apr. 17, 1990

[54] VEHICLE HEADLAMP

[75] Inventor: Naohi Nino, Shizuoka, Japan

[73] Assignee: Koito Seisakusho Co., Ltd., Shizuoka, Japan

[21] Appl. No.: 267,470

[22] Filed: Nov. 4, 1988

[30] Foreign Application Priority Data

Nov. 5, 1987 [JP] Japan ................................ 62-278195

[51] Int. Cl.[4] ................................................ B60Q 1/04

[52] U.S. Cl. ...................................... 362/61; 362/298; 362/299; 362/346

[58] Field of Search ................. 362/61, 297, 298, 346, 362/350, 299

[56] References Cited

U.S. PATENT DOCUMENTS

| | | | |
|---|---|---|---|
| 4,100,594 | 7/1978 | Gould | 362/308 |
| 4,511,955 | 4/1985 | Ernst et al. | 362/347 |
| 4,517,630 | 5/1985 | Dieffenbach et al. | 362/268 |
| 4,566,056 | 1/1986 | Kouchi et al. | 362/297 |
| 4,612,608 | 9/1986 | Peitz | 362/297 |
| 4,697,225 | 9/1987 | Lindae et al. | 362/61 |
| 4,731,713 | 3/1988 | Perthus | 362/297 |
| 4,755,919 | 7/1988 | Lindae et al. | 362/297 |
| 4,772,987 | 9/1988 | Kretschmer et al. | 362/297 |
| 4,800,467 | 1/1989 | Lindae et al. | 362/297 |

FOREIGN PATENT DOCUMENTS

| | | | |
|---|---|---|---|
| 2039616 | 2/1972 | Fed. Rep. of Germany | 362/297 |
| 215874 | 5/1924 | United Kingdom | 362/297 |
| 226621 | 12/1924 | United Kingdom | 362/297 |

*Primary Examiner*—Ira S. Lazarus
*Assistant Examiner*—Richard R. Cole
*Attorney, Agent, or Firm*—Sughrue, Mion, Zinn, Macpeak & Seas

[57] ABSTRACT

Herein disclosed is a vehicle headlamp which comprises a compound light reflector including a plurality of concave light reflecting surfaces which are arranged to have a first common focus, either one of a second common focus and a second common focal line, and a common optical axis, each light reflecting surface being so shaped as to provide an elliptical line when cut by a vertical plane; a light source located on the first common focus of the compound light reflector; a shade plate positioned in front of the compound light reflector, the shade plate having an upper edge located in the vicinity of one of the second common focus and the second common focal line; and a converging lens located in front of the shade plate in such a manner that a focus of the lens is positioned on the upper edge of the shade plate.

8 Claims, 11 Drawing Sheets

VEHICLE HEADLAMP

BACKGROUND OF THE INVENTION

1. Field of the Invention

The present invention relates in general to vehicle headlamps, and more particularly to vehicle headlamps of a so-called "projector type" which comprises an electric bulb for generating light, a concave reflector for reflecting the light forward, a shade plate placed in front of the concave reflector for partially shading and thus contouring the reflected light, and a coverging lens placed in front of the shade plate for projecting the contoured light beam forward.

2. Description of the Prior Art

In order to clarify the task of the present invention, a conventional projector type conventional vehicle headlamps will be described with reference to FIGS. 13 to 15.

FIGS. 13 and 14 show schematically the conventional headlamp which is generally designated by reference "a". This headlamp "a" is used as a lower beam projector which projects the light beam intended for a forward neighbouring illumination particularly used when the vehicle is meeting or following other vehicles.

Designated by "b" is a concave light reflector which has an ellipsoidal light reflecting surface "c" formed on an inside face thereof. A light source "d" is placed on a first focus "$f_1$" of the light reflecting surface "c". Thus, light rays emitted from the light source "d" are reflected forward by the reflecting surface "c" and converged at a second focus "$f_2$" of the surface "c". Because the light source "d" has certain dimensions, the bundle of the light rays converged at the second focus "$f_2$" has a certain sectional area.

Designated by reference "e" is a shade plate whose upper edge is designated by reference "f". The shade plate "e" is arranged in front of the light reflector "b" in such a manner that the upper edge "f" thereof is located in the vicinity of the second focus "$f_2$" of the reflecting surface "c". The line designated by "X—X" is the optical axis of the light reflecting surface "c".

A converging lens "g" is arranged in front of the shade plate "e" in such a manner that a focus "$f_c$" is placed on a center of the upper edge "f" of the shade plate "e".

When, with the arrangement as described hereinabove, the light source "d" is energized, the light rays emitted therefrom are reflected forward by the light reflector "b" and converged at the second focus "$f_2$" of the reflector "b". Due to presence of the upper edge "f" of the shade plate "e" near the second focus "$f_2$", part of the reflected light rays from the reflector "b" is shaded. Thus, the light beam projected forward from the lens "g" has such a contoured cross-sectional pattern "b" as shown in FIG. 15. That is, the projected beam from the lens "g" has an inverted image of the upper edge "f" of the shade plate "e". The bent line "i" in the pattern "h" in FIG. 15 is provided by the upper edge "f" of the shade plate "e". It is to be noted that, in FIG. 15, the line denoted by "H—H" is a horizontal line extending perpendicular to the optical axis "X—X", while the line denoted by "V—V" is a vertical line extending perpendicular to the optical axis "X—X".

However, due to its inherent construction, the abovementioned conventional headlamp has the following drawbacks.

That is, the projected beam pattern "h" produced by the headlamp is poor in producing emphasized illuminance and in obtaining a desired illumination expansion.

In fact, the illuminance of the projected beam pattern "h" is gradually lowered as the distance from the center of the pattern "h" increases. This is because the luminous flux at the upper edge "f" of the shade plate "e" is gradually reduced with increase of a distance therefrom in the radial direction. Furthermore, when the lateral size of the projected beam pattern "h" is increased, the illuminance of the center zone of the same is inevitably lowered. These phenomena do not meet the requirement of the vehicle headlamps.

SUMMARY OF THE INVENTION

It is therefore an object of the present invention to provide a vehicle headlamp which is free of the abovementioned drawbacks.

According to the present invention, there is provided a projector type vehicle headlamp which can project a beam pattern whose illuminance gradation is emphasized and whose lateral size is increased to a desired degree.

According to the present invention, there is provided a vehicle headlamp which comprises a compound light reflector including a plurality of concave light reflecting surfaces which are arranged to have a first common focus, either one of a second common focus and a second common focal line, and a common optical axis, each light reflecting surface being so shaped as to provide an elliptical line when cut by a vertical plane; a light source located on the first common focus of the compound light reflector; a shade plate positioned in front of the compound light reflector, the shade plate having an upper edge located in the vicinity of one of the second common focus and the second common focal line; and a converging lens located in front of the shade plate in such a manner that a focus of the lens is positioned on the upper edge of the shade plate.

BRIEF DESCRIPTION OF THE DRAWINGS

Other objects and advantages of the present invention will become apparent from the following description when taken in conjunction with the accompanying drawings, in which.

DETAILED DESCRIPTION OF THE INVENTION

Figure 1:
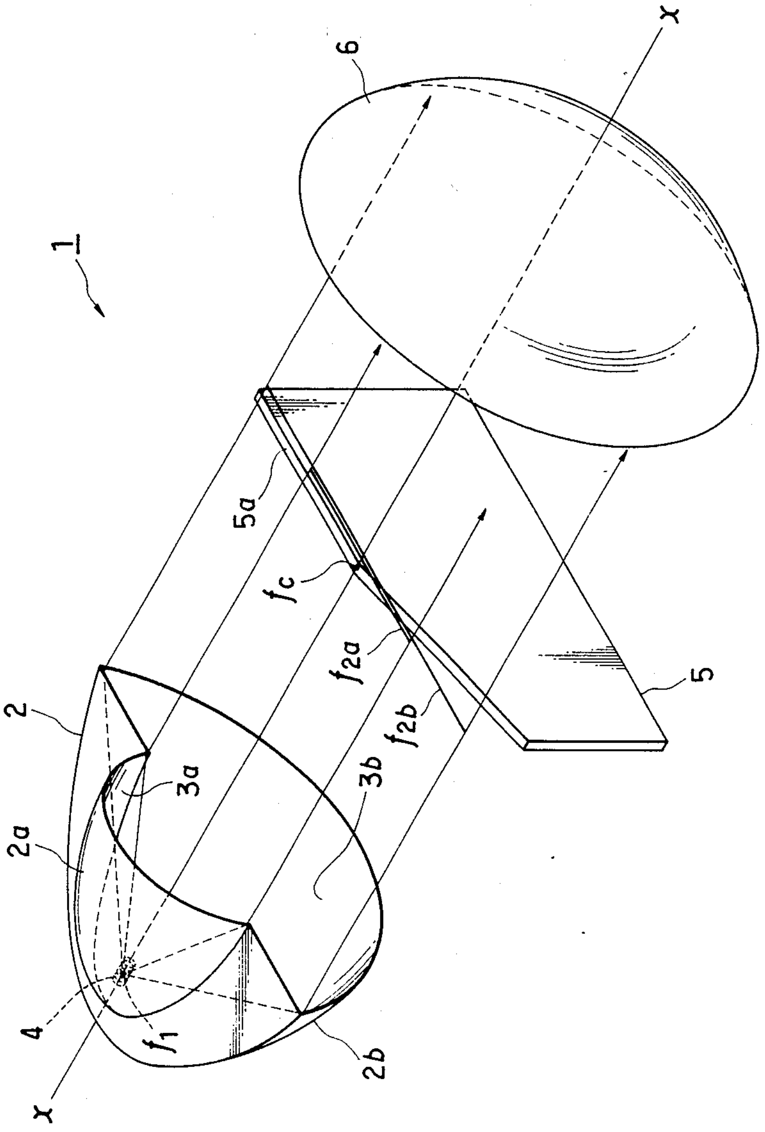
FIG. 1 is a schematically illustrated perspective view of a vehicle headlamp of a first embodiment of the present invention.
Figure 2:
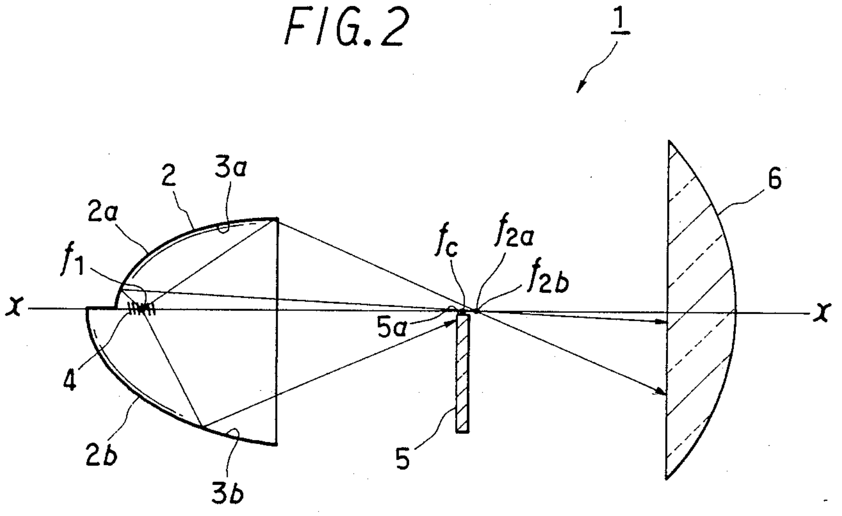
FIG. 2 is a schematically illustrated vertically sectional view of the headlamp of the first embodiment.
Figure 3:
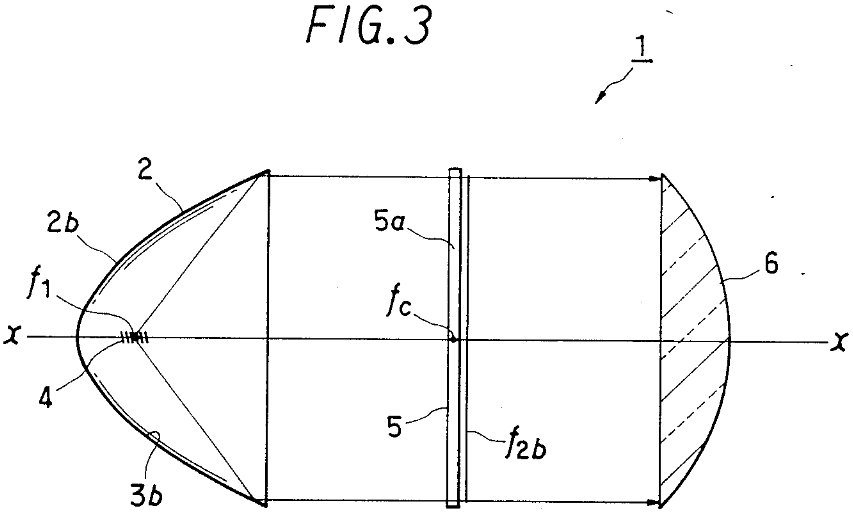
FIG. 3 is a schematically illustrated horizontally sectional view of the headlamp of the first embodiment.

Referring to FIGS. 1 to 3, particularly FIG. 1, there is shown, but schematically, a projector type headlamp of a first embodiment of the present invention, which is used as, for example, an automotive dimmer beam headlamp.

Designated by numeral 2 is a compound light reflector which comprises a smaller upper part 2a and a larger lower part 2b which are combined to form a single unit.

Each part 2a or 2b has a "paraboloid & ellipsoid compound light reflecting surface".

As is known to those skilled in the art, the paraboloid and ellipsoid compound light reflecting surface has the following features.

That is, when cut by a horizontal plane, it shows a parabolic line along the cut edge, while, when cut by a vertical plane, it shows an elliptic line along the cut edge. Furthermore, the focus of the parabolic line and a first focus of the elliptic line are located at the same point. Thus, when a light source is located at the this point, the light rays emitted from the light source are reflected by the light reflecting surface and converged into a focal line which extends laterally with respect to an optical axis of the light reflecting surface.

As will be understood from FIG. 1, the focal distance of the light reflecting surface 3a of the upper part 2a is smaller than that of the lower part 2b. Furthermore, these light reflecting surfaces 3a and 3b have a common optical axis "X—X".

Designated by numeral 4 is a light source, such as a filament of an electric bulb, which is located on the common focus "$f_1$" of the light reflecting surfaces 3a and 3b. Accordingly, upon energization of the light source 4, the light rays from the light source 4 are reflected by the upper and lower light reflecting surfaces 3a and 3b and converged into respective focal lines "$f_{2a}$" and "$f_{2b}$". Although, the focal lines "$f_{2a}$" and "$f_{2b}$" are illustrated to be separated from each other, the focal line "$f_{2a}$" is put on a middle part of the other focal line "$f_{2b}$" and merged therewith, practically.

In front of the light reflector 2, there is arranged a shade plate 5 which has an upper edge 5a with an inclined part. The shade plate 5 is arranged below the optical axis "X—X" having the upper edge 5a thereof placed near the axis "X—X" and the focal lines "$f_{2a}$" and "$f_{2b}$" and extends along these lines.

A converging lens 6 is arranged in front of the shade plate 5. That is, the lens 6 is arranged in such a manner that a focus "$f_c$" thereof is placed on a laterally middle part of the upper edge 5a of the shade plate 5.

Upon energization of the light source 4, light rays are emitted therefrom and reflected by the compound light reflector 2 and converged into the merged focal lines "$f_{2a}$" and "$f_{2b}$" which extend laterally with respect to the optical axis "X—X". That is, the light rays reflected by the upper part 3a of the reflector 2 are converged into the focal line "$f_{2a}$", while those reflected by the lower part 3b are converged into the longer focal line "$f_{2b}$". Because of the reasons which have been described hereinabove, the actual length of the focal line "$f_{2b}$" is longer than that of the focal line "$f_{2a}$".

Figure 4:
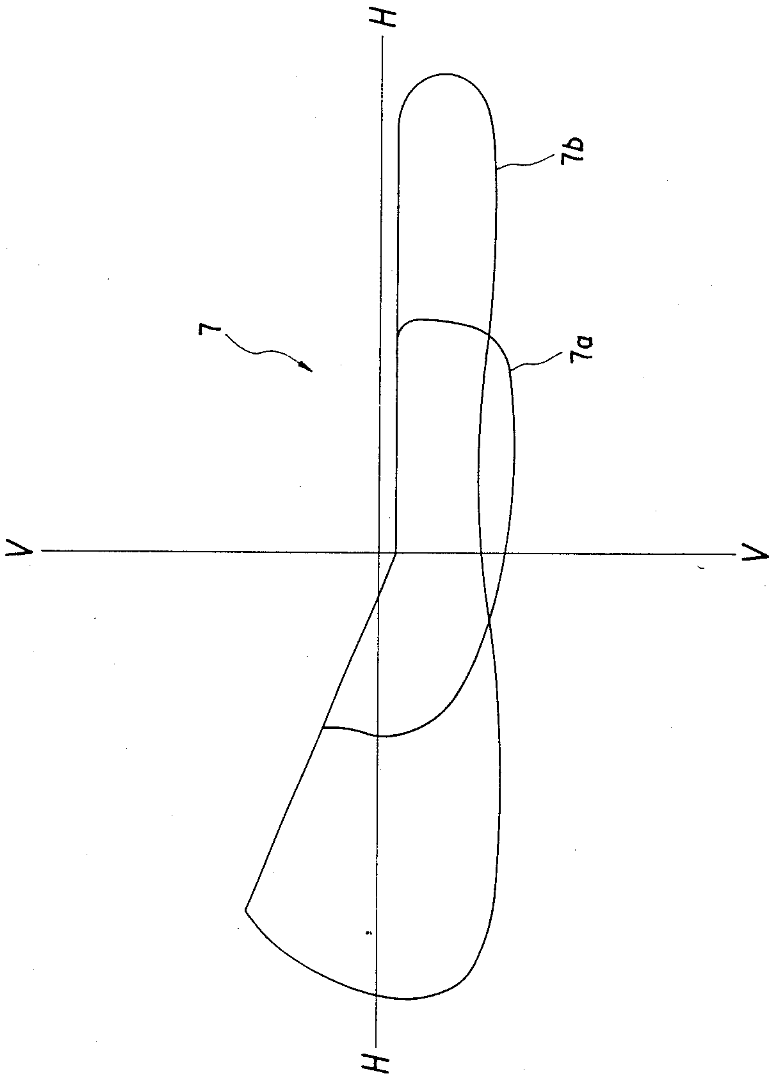
FIG. 4 is a view of a projected beam pattern which is provided by the headlamp of the first embodiment.

A lower part of the light beam from each part 3a or 3b of the reflector 2 is blocked by the shade plate 5. That is, only an upper part of each light beam is permitted to travel toward the lens 6 beyond the shade plate 5. The lens 6 thus projects forward two types of light beams each including an inverted image of the upper edge 5a of the shade plate 5. That is, the light beam projected from the lens 6 includes a contoured cross sectional pattern 7 as illustrated in FIG. 4. In the pattern 7, the center smaller zone denoted by numeral 7a is the highly illuminated zone which is produced by the reflected light from the upper part 3a, while, the laterally expanding zone 7b is a less illuminated zone which is produced by the reflected light from the lower part 3b. It is to be noted that the lateral length of each zone 7a or 7b depends on the length of the focal line "$f_{2a}$" or "$f_{2b}$".

Thus, the headlamp 1 of the first embodiment can project the pattern 7 which has both the highly illuminated middle zone 7a provided by the upper part 3a of the compound light reflector 2 and the laterally expanding dimmer zone 7b provided by the lower part 3b.

Figure 5:
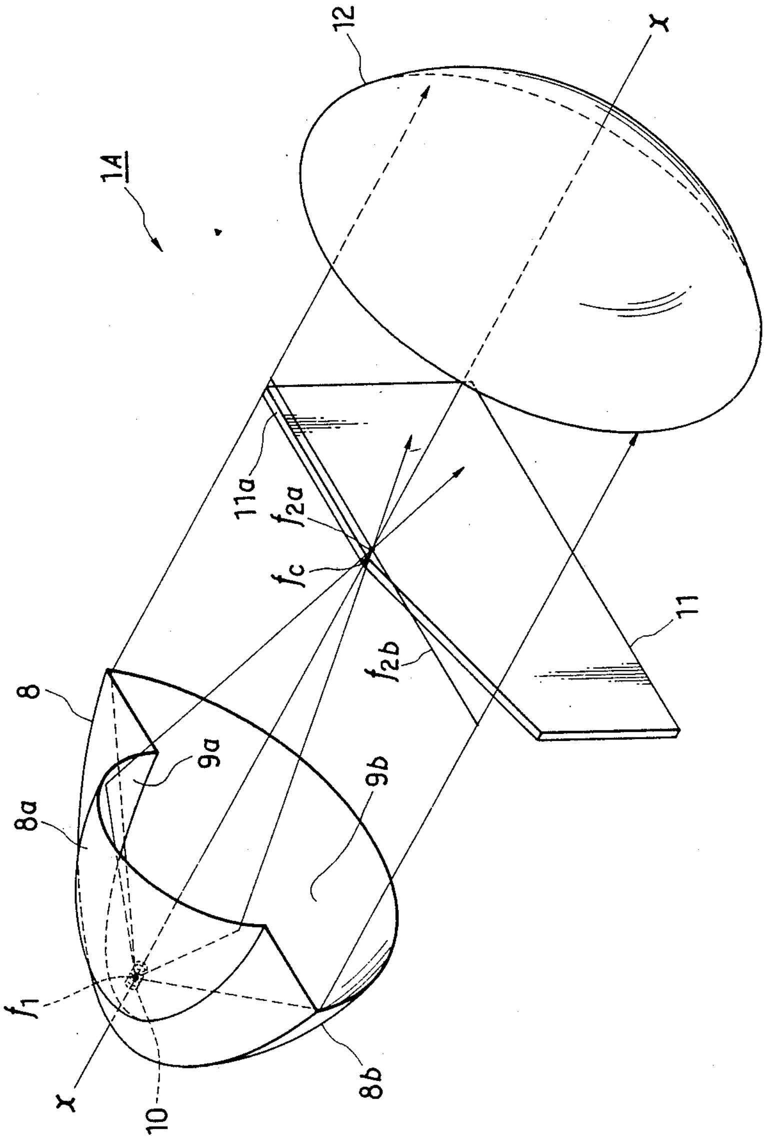
FIG. 5 is a schematically illustrated perspective view of a vehicle headlamp of a second embodiment of the present invention.
Figure 6:
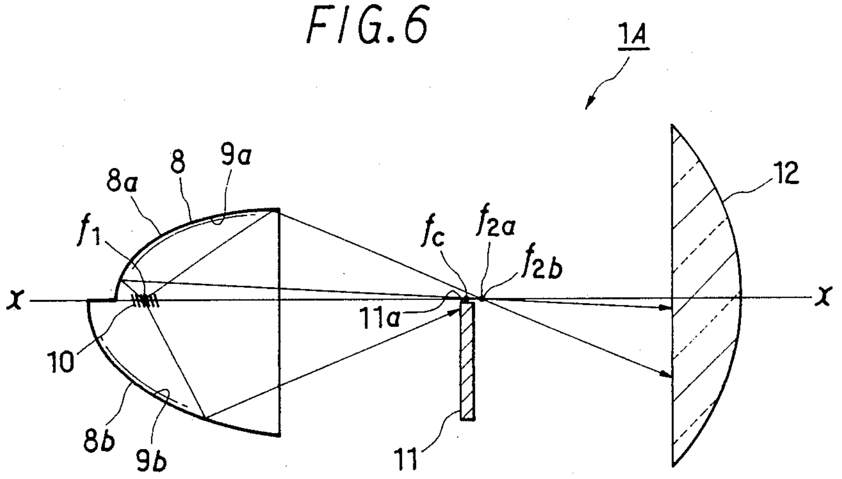
FIG. 6 is a schematically illustrated vertically sectional view of the headlamp of the second embodiment.
Figure 7:
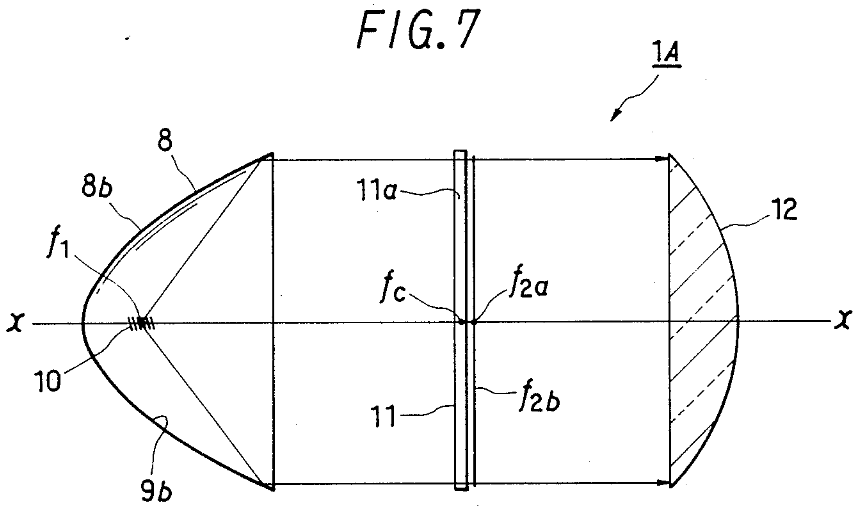
FIG. 7 is a schematically illustrated horizontally sectional view of the headlamp of the second embodiment.

Referring to FIGS. 5 to 7, particularly FIG. 5, there is shown a second embodiment 1A of the present invention.

Designated by numeral 8 is a compound light reflector which comprises a smaller upper part 8a and a larger lower part 8b which are combined to form a single unit.

The upper part 8a has a light reflecting surface 9a of ellipsoid of revolution, while, the lower part 8b has a paraboloid and ellipsoid compound light reflecting surface 9b. The reflecting surfaces 9a and 9b have a common first focus "$f_1$". A second focus "$f_{2a}$" of the reflecting surface 9a is located at a middle part of a focal line "$f_{2b}$" of the other reflecting surface 9b, as is understood from FIG. 5. Similar to the case of the afore-mentioned first embodiment, the light reflecting surfaces 9a and 9b have a common optical axis "X—X".

Designated by numeral 10 is a light source which is located on the common first focus "$f_1$" of the surfaces 9a and 9b. Accordingly, upon energization of the light source 10, the light rays emitted therefrom are reflected by the upper and lower light reflecting surfaces 9a and 9b and converged into the second focus "$f_{2a}$" and the focal line "$f_{2b}$", respectively. The focal line "$f_{2b}$" extends laterally with respect to the optical axis "X—X".

In front of the light source 10, there is arranged a shade plate 11 which has an upper edge 11a with an inclined part. The shade plate 11 is arranged below the optical axis "X—X" having the upper edge 11a thereof placed near the axis, the second focus "$f_{2a}$" and the focal line "$f_{2b}$" and extends along the focal line "$f_{2b}$".

A converging lens 12 is arranged in front of the shade plate 11. That is, the lens 12 is arranged in such a manner that a focus "$f_c$" thereof is placed on a laterally middle part of the upper edge 11a of the shade plate 11.

Upon energization of the light source 10, light rays are emitted therefrom and reflected by the compound light reflector 8 and converged into the second focus "$f_{2a}$" and the focal line "$f_{2b}$", respectively, as is described hereinabove.

Figure 8:
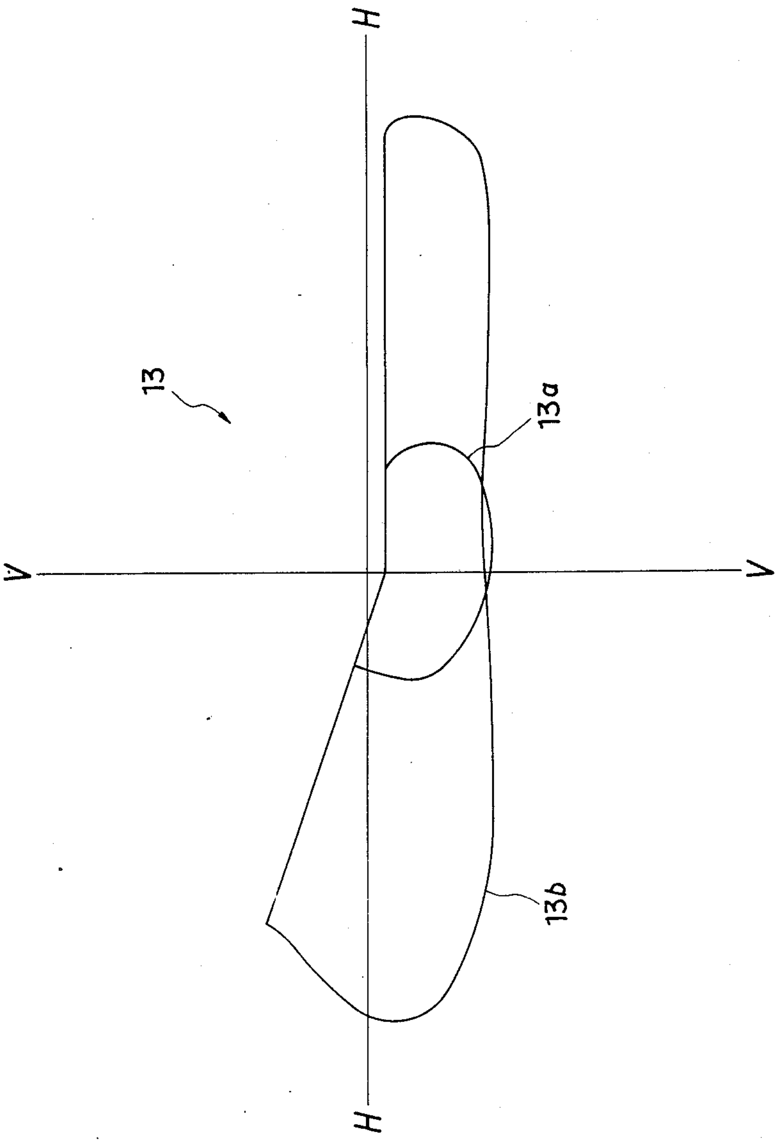
FIG. 8 is a view of a projected beam pattern which is provided by the headlamp of the second embodiment.

Thus, for substantially the same reason as mentioned hereinabove, the light beam projected from the lens 12 includes a contoured cross-sectional pattern 13 as illustrated in FIG. 8. In the pattern 13, the center smaller zone denoted by numeral 13*a* is the highly illuminated zone which is produced by the reflected light from the upper part 8*a*, while, the laterally expanding zone denoted by numeral 13*b* is a less illuminated zone which is produced by the reflected light from the lower part 8*b*.

In the second embodiment 1A, the center smaller zone 13*a* is much brighter than the center smaller zone 7*a* of the projected pattern 7 provided by the aforementioned first embodiment 1. This is because, in the second embodiment, the reflected light rays from the upper part 8*a* and converged near the shade plate 11 has a smaller cross section and higher flux density due to the nature of the ellipsoidal reflecting surface which the upper part 8*a* has.

Figure 9:
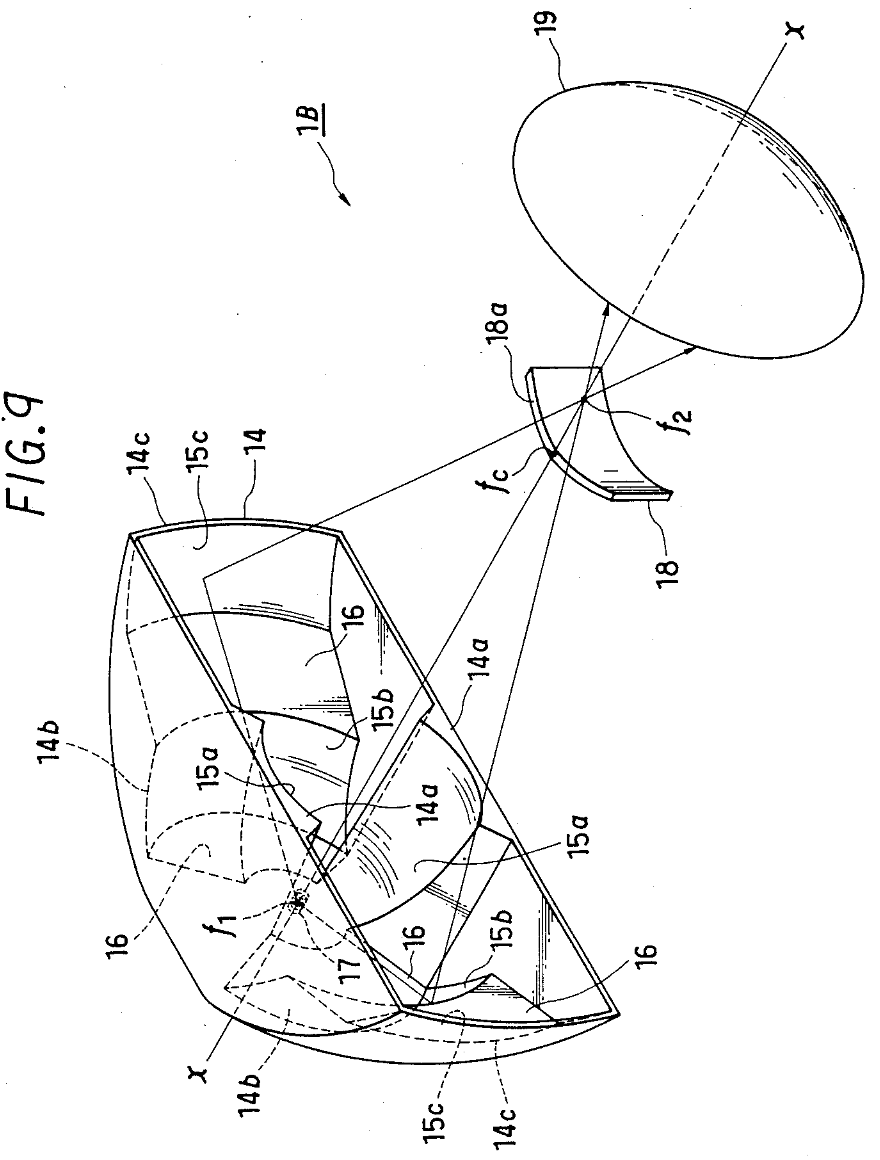
FIG. 9 is a schematically illustrated perspective view of a vehicle headlamp of a third embodiment of the present invention.
Figure 10:
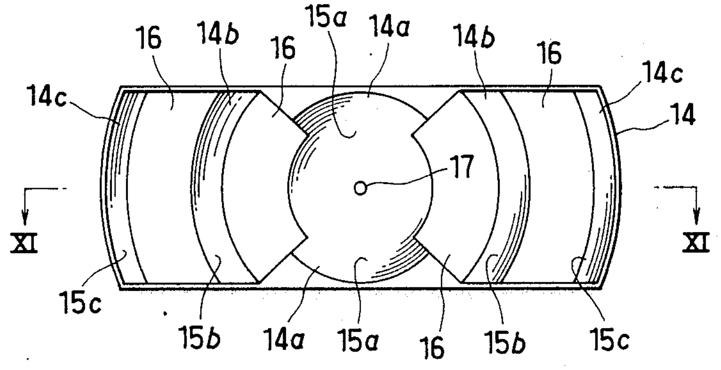
FIG. 10 is a front view of a light reflector employed in the third embodiment.
Figure 11:
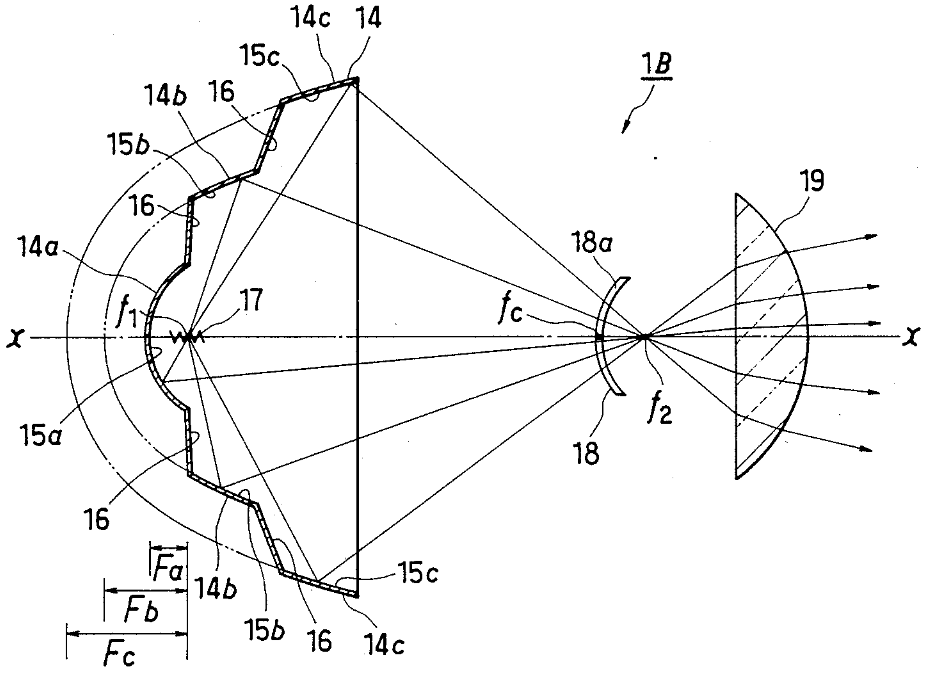
FIG. 11 is a schematically illustrated horizontally sectional view of the headlamp of the third embodiment.

Referring to FIGS. 9 to 11, particularly FIG. 9, there is shown a third embodiment 1B of the present invention.

Designated by numeral 14 is a compound light reflector which comprises a first pair of parts 14*a* and 14*a*, a second pair of parts 14*b* and 14*b* and a third pair of parts 14*c* and 14*c* which are combined to form a single unit.

As is best seen from FIG. 10, the first pair 14*a* and 14*a* are arranged at a central part of the reflector 14, the second pair 14*b* and 14*b* are arranged on both sides of the first pair 14*a* and 14*a*, and the third pair 14*c* and 14*c* are arranged on both sides of the second pair 14*b* and 14*b*.

Each part of the pairs 14*a*, 14*b* and 14*c* has a light reflecting surface 15*a*, 15*b* or 15*c* of ellipsoid of revolution. These six light reflecting surfaces 15*a*, 15*b* and 15*c* have their first and second focuses "$f_1$" and "$f_2$" and their optical axes "X—X" commonly. The local distance "Fb" of each second pair 14*b* is larger than that "Fa" of the first pair 14*a* but smaller than that "Fc" of the third pair 14*c*.

The sectoral portions (see FIG. 10) denoted by numeral 16 are nonreflective zones which are arranged between the first pair 14*a* and the second pair 14*b* and between the second pair 14*b* and the third pair 14*c*.

Designated by numeral 17 is a light source which is located on the common first focus "$f_1$" of the compound light reflector 14. Thus, upon energization of the light source 17, the light rays emitted therefrom are reflected by the first, second and third light reflecting pairs 14*a*, 14*b* and 14*c* of the light reflector 14 and converged into their common second focus "$f_2$" as is understood from FIG. 11.

In front of the light source 17, there is arranged a curved shade plate 18 which has an upper edge 18*a*. The curved shade plate 18 is arranged with its convex surface facing the reflector 14. More specifically, the shade plate 18 is arranged below the optical axis "X—X" having the upper edge 18*a* thereof placed near the axis "X—X" and the second focus "$f_2$" but at a position between the reflector 14 and the second focus "$f_2$". The curvature of the shade plate 18 is so made as to match with the curvature of field of an after-mentioned converging lens 19, the curvature of field being provided when cut by a horizontal plane.

The converging lens 19 is arranged in front of the shade plate 18. That is, the lens 19 is arranged in such a manner that a focus "$f_c$" thereof is placed on a laterally middle part of the upper edge 18*a* of the curved shade plate 18.

Upon energization of the light source 17, light rays are emitted therefrom and reflected by the light reflector 14 and converged into the second common focus "$f_2$" as is described hereinabove.

That is, the light rays reflected by the first, second and third pairs 14*a*, 14*b* and 14*c* of the reflector 14 are directed toward the second common focus "$f_2$" and thus have at the upper edge 18*a* of the shade plate 18 certain sectional areas whose size becomes greater in the order of the light rays from the pairs 14*a*, 14*b* and 14*c*.

Figure 12:
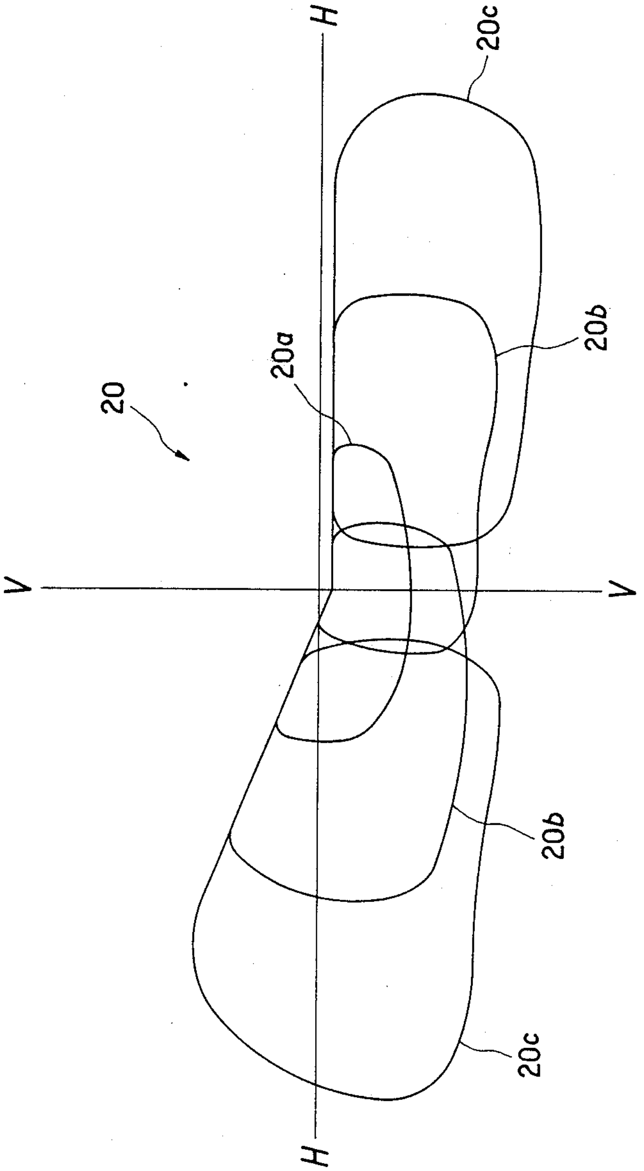
FIG. 12 is a view of a projected beam pattern which is provided by the headlamp of the third embodiment.
Figure 13:
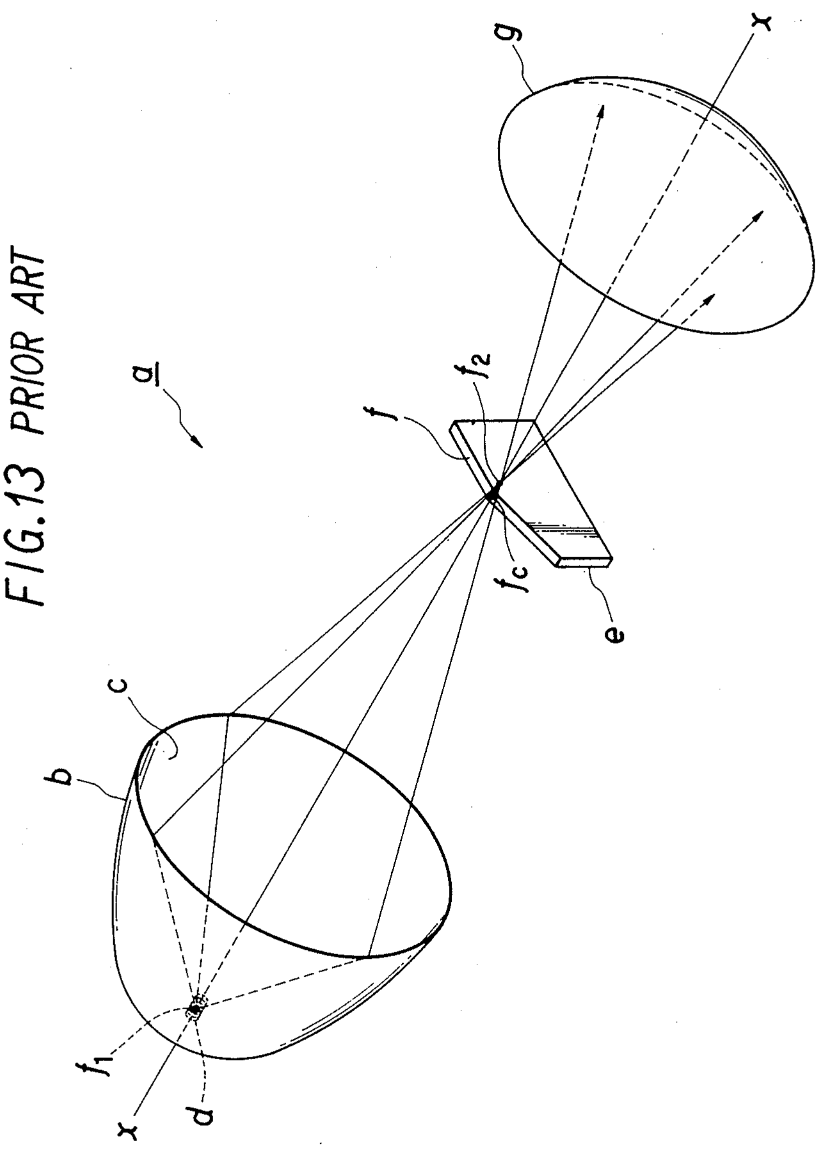
FIG.13 PRIOR ART
FIG. 13 is a schematically illustrated perspective view of a conventional projector type headlamp.
Figure 14:
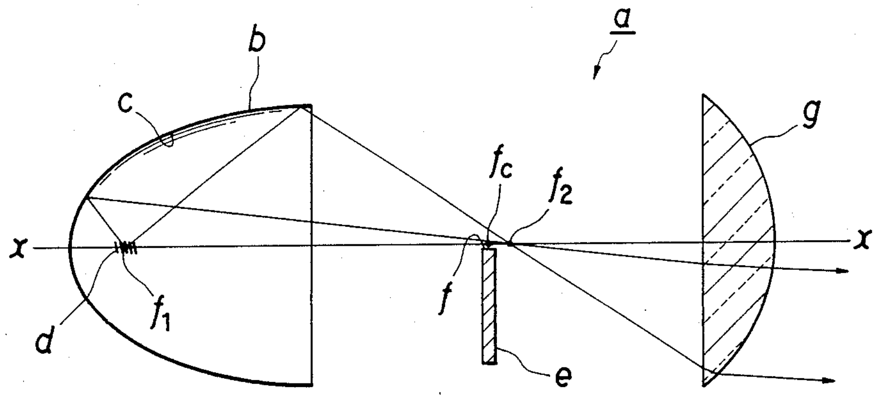
FIG.14 PRIOR ART
FIG. 14 is a schematically illustrated vertically sectional view of the conventional headlamp.
Figure 15:
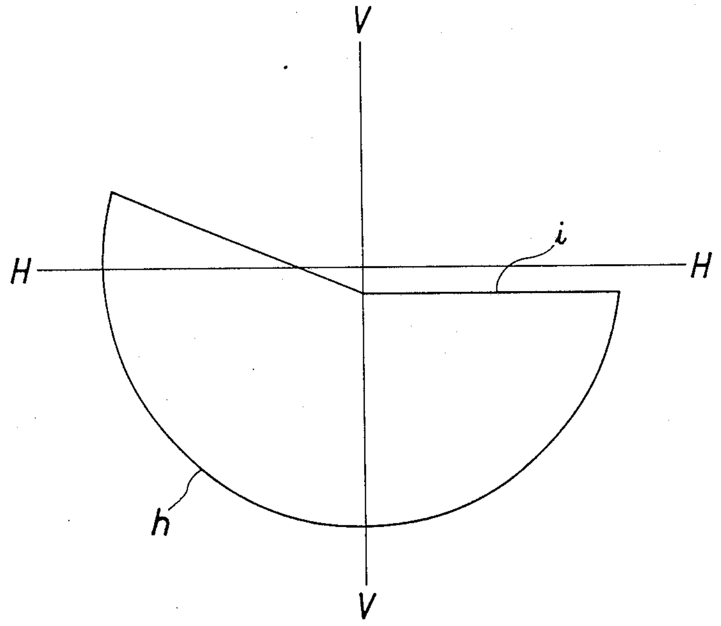
FIG.15 PRIOR ART
FIG. 15 is a view of a projected beam pattern which is provided by the conventional headlamp.

Thus, the light beam projected from the lens 19 includes a contoured cross-sectional pattern 20 as illustrated in FIG. 12. In the pattern 20, the center small zone denoted by numeral 20*a* is the highly illuminated merged zone which is provided by the reflected light from the first pair 14*a*, the intermediate two zones denoted by numerals 20*b* and 20*b* are moderately illuminated zones which are produced by the reflected light from the second pair 14*b*, and the laterally expanding larger two zones denoted by numerals 20*c* and 20*c* are less illuminated zones which are produced by the reflected light from the third pair 14*c*.

Thus, when the number of the light reflecting surfaces increases, it becomes possible to provide the projected pattern with various types of illumination gradation, which meets the requirement of automotive headlamps.

As will be understood from the above description, the vehicle headlamp according to the present invention can provide a projected light beam pattern with sharply contoured illumination zones and sufficiently expanded size. Furthermore, since the light reflecting surfaces are arranged to have their first focuses and second focuses or focal lines commonly, the light control by the shade plate and the lens is easily achieved.

The present embodiments of this invention are to be considered in all respects as illustrative and not restrictive, the scope of the invention being indicated by the appended claims rather than by the foregoing description. All changes which come within the meaning and range of equivalency of the claims therefore are intended to be embraced therein.

What is claimed is:

1. A vehicle headlamp comprising:

a compound light reflector including a plurality of concave light reflecting surfaces which are arranged to have a first common focus, either one of a second common focus and a second common focal line, and a common optical axis, each light reflecting surface being so shaped as to provide an elliptical line when cut by a vertical plane, at least one of said light reflecting surfaces being so shaped as to provide a parabolic line when cut by a horizontal plane;

a light source located on said first common focus of said compound light reflector;

a shade plate positioned in front of said compound light reflector, said shade plate having an upper edge located in the vicinity of one of said second common focus and said second common focal line; and a converging lens located in front of said shade plate in such a manner that a focus of the lens is positioned on said upper edge of said shade plate, wherein light rays produced by said light source are reflected by the respective light reflecting surfaces to produce respective light beams which are permitted to project forward through said lens, said respective light beams having contoured cross-sectional pattern zones which are different in lateral length.

2. A vehicle headlamp as claimed in claim 1, in which said concave light reflecting surfaces comprise upper and lower light reflecting surfaces which are located at upper and lower portions with respect to a horizontal plane which includes said common optical axis, and in which at least one of said light reflecting surfaces is further so shaped as to provide a parabolic cut line when cut by a horizontal plane.

3. A vehicle headlamp as claimed in claim 2, in which said upper and lower light reflecting surfaces are formed respectively on two reflectors which are respectively arranged at upper and lower portions with respect to said horizontal plane.

4. A vehicle headlamp as claimed in claim 3, in which the focal distance of said upper light reflecting surface is smaller than that of said lower light reflecting surface.

5. A vehicle headlamp as claimed in claim 4, in which said focus of said converging lens is positioned on a laterally middle part of said upper edge of said shade plate.

6. A vehicle headlamp as claimed in claim 5, in which said shade plate extends in a direction perpendicular to said common optical axis.

7. A vehicle headlamp as claimed in claim 6, in which said shade plate is arranged below said common optical axis having the upper edge thereof placed in the vicinity of said common optical axis.

8. A vehicle headlamp as claimed in claim 2, in which said upper and lower light reflecting surfaces are formed on respective reflectors which are combined to form a single unit.

* * * * *